United States Patent [19]
Okaniwa et al.

[11] Patent Number: 5,317,926
[45] Date of Patent: Jun. 7, 1994

[54] ELECTROMAGNETIC FLOWMETER

[75] Inventors: Hiroshi Okaniwa; Atsushi Koshimizu; Ichiro Mitsutake, all of Tokyo, Japan

[73] Assignee: Yamatake-Honeywell Co., Ltd., Tokyo, Japan

[21] Appl. No.: 979,658

[22] Filed: Nov. 19, 1992

[30] Foreign Application Priority Data

Nov. 20, 1991 [JP] Japan .................................. 3-329755

[51] Int. Cl.$^5$ .............................................. G01F 1/60
[52] U.S. Cl. ............................. 73/861.17; 73/861.12
[58] Field of Search ............ 73/861.12, 861.16, 861.17

[56] References Cited

U.S. PATENT DOCUMENTS

| 3,855,858 | 12/1974 | Cushing | 73/861.17 |
|---|---|---|---|
| 4,303,980 | 12/1981 | Yard | 73/861.17 |
| 4,644,799 | 2/1987 | Tomita | 73/861.12 |
| 4,658,653 | 4/1987 | Tomita | 73/861.12 |

FOREIGN PATENT DOCUMENTS 2137360 10/1984 United Kingdom ............. 73/861.16

Primary Examiner—Richard E. Chilcot, Jr.
Assistant Examiner—Elizabeth L. Dougherty
Attorney, Agent, or Firm—Blakeley, Sokoloff, Taylor & Zafman

[57] ABSTRACT

An electromagnetic flowmeter for obtaining a detection signal by sampling voltages generated from electrodes in contact with a conductive fluid flowing in a magnetic field at a predetermined timing includes an external noise detecting section, a pseudo-noise signal generating section, and a timing signal generating section. The external noise detecting section detects external noise, superposed on the fluid, from the electrodes. The pseudo-noise generating section supplies a pseudo-noise signal for a predetermined period of time if the external noise detecting section determines that no external noise signal is detected. The timing signal generating section generates a timing at which an excitation current for generating the magnetic field is generated, and the sampling timing on the basis of the pseudo-noise signal while the pseudo-noise signal is kept supplied, and causes the external noise detecting section to generate the timing at which the excitation current for generating the magnetic field is generated, and the sampling timing while no pseudo-noise signal is supplied.

1 Claim, 4 Drawing Sheets

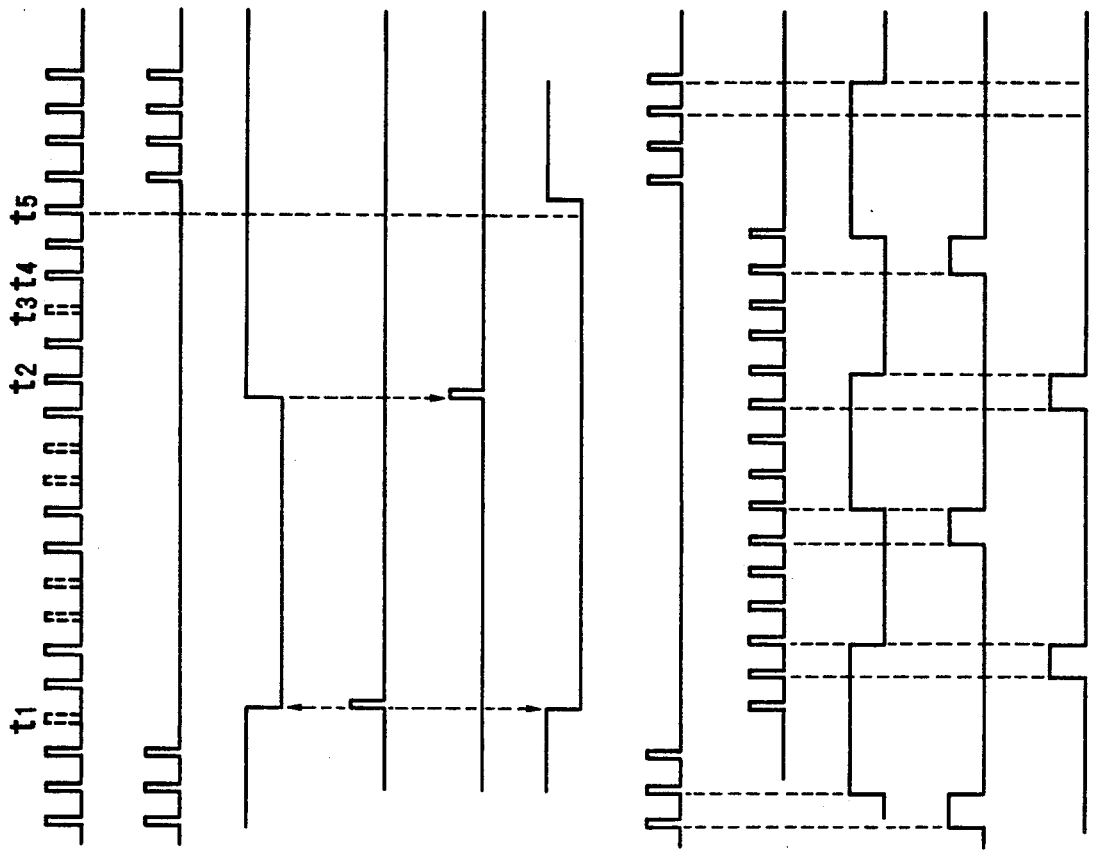

ELECTROMAGNETIC FLOWMETER

BACKGROUND OF THE INVENTION

The present invention relates to an electromagnetic flowmeter for detecting the flow rate of a conductive fluid in a process control apparatus.

A detection signal corresponding to the flow rate of a conductive fluid flowing in a magnetic field can be obtained by sampling voltages generated from electrodes in contact with the fluid at a predetermined timing. This principle is used for an electromagnetic flowmeter.

Since electrochemical noise is superposed on the detection signal, the polarities of an excitation current are alternately changed to remove the noise. However, if the polarities are alternately changed, it takes time to stabilize the state of the excitation current. For this reason, whenever the excitation polarity is changed, sampling is performed after a stabilization time at which the state is stabilized, thereby obtaining a detection signal.

Such an operation requires an excitation current switching timing at which the polarities of an excitation current are switched, and a sampling timing at which sampling is performed. Both the timings are generated by a timing generating means incorporated in the flowmeter.

However, in addition to the electrochemical noise described above, external noise (since most of the external noise is commercial power supply noise, the noise will be referred to as commercial power supply noise hereinafter) may also be superposed on the detection signal. If this noise is small, no problem is posed. If, however, the amplitude of the commercial power supply noise is large, since the noise is not synchronized with internal timing signals, conspicuous variations or fluctuations in output are caused. In some case, periodic variations with a long duration called beats are caused, interfering with measurement.

If a flowmeter is designed to be operated by a commercial power supply, a timing signal and commercial power supply noise are synchronized with each other by forming the timing signal from the commercial power supply. Therefore, a noise reduction effect can be expected. However, commercial power supply noise is often mixed with noise from another power supply system, the noise reduction effect is not as high as expected in many cases.

In addition, if the flowmeter is designed to be operated by a DC power supply, since there is no signal synchronized with a commercial power supply, variations in output tent to occur.

Since a timing signal is generated on the basis of an external noise signal detected by the noise detecting means, the timing signal and the external noise signal are synchronized with each other. Therefore, a noise reduction effect can be obtained. Even if no external noise signal can be detected during a given period for some reason, a pseudo-noise signal is continuously generated by the pseudo-noise generating means during the period. A timing signal is generated on the basis of this pseudo-noise signal. When the period during which the pseudo-noise signal is generated is ended, a timing signal is generated on the basis of the external noise signal detected by the external noise detecting means.

SUMMARY OF THE INVENTION

It is an object of the present invention to provide an electromagnetic flowmeter capable of generating a stable timing signal synchronized with commercial power supply noise.

In order to achieve the above object, according to the present invention, there is provided an electromagnetic flowmeter for obtaining a detection signal by sampling voltages generated from electrodes in contact with a conductive fluid flowing in a magnetic field at a predetermined timing, comprising external noise detecting means for detecting external noise, superposed on the fluid, from the electrodes, pseudo-noise generating means for supplying a pseudo-noise signal for a predetermined period of time if the external noise detecting means determines that no external noise signal is detected, and timing signal generating means for generating a timing at which an excitation current for generating the magnetic field is generated, and the sampling timing on the basis of the pseudo-noise signal while the pseudo-noise signal is kept supplied, and causing the external noise detecting means to generate the timing at which the excitation current for generating the magnetic field is generated, and the sampling timing while no pseudo-noise signal is supplied.

BRIEF DESCRIPTION OF THE DRAWINGS

FIGS. 4A to 4K are timing charts showing waveforms at the respective portions of the circuit shown in FIG. 3.

DESCRIPTION OF THE PREFERRED EMBODIMENTS

Figure 1:
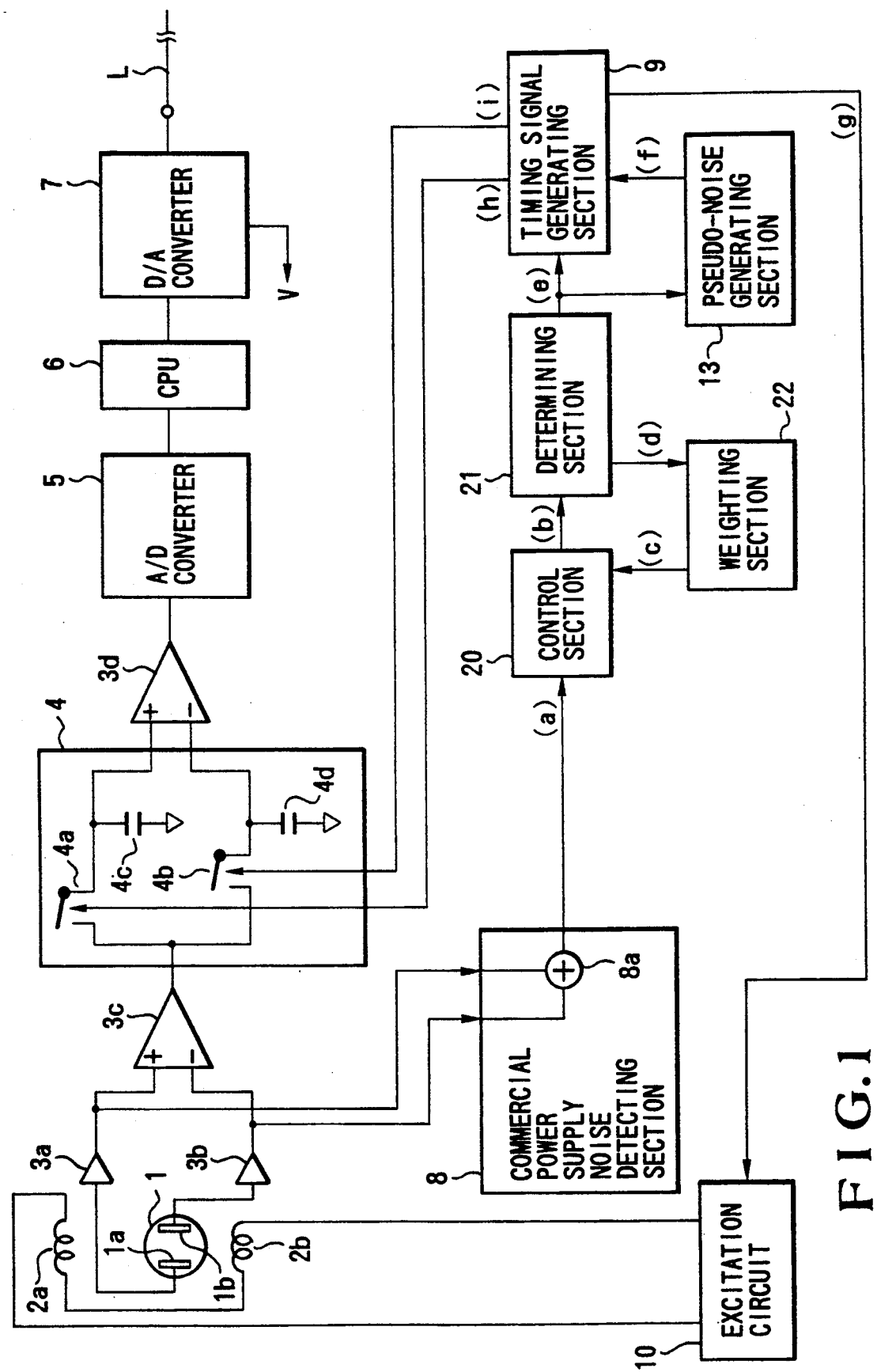
FIG. 1 is a block diagram showing the arrangement of an embodiment of the present invention.

FIG. 1 shows an embodiment of the present invention. Referring to FIG. 1, a conductive fluid flows in a pipe path 1. When a magnetic field is generated by a current flowing in excitation coils 3a and 3b, signals corresponding to the flow rate of the fluid can be obtained from electrodes 1a and 1b.

The detected signals are amplified by the amplifiers 3a and 3b, and are differentially amplified by a differential amplifier 3c. The amplified signal is sampled by a sampling circuit 4. The sampling result is then stored in capacitors 4c and 4d. A signal corresponding to the difference between the outputs from the capacitors 4c and 4d is supplied to an A/D converter 5 through a differential amplifier 3d to be converted into a digital signal. The digital signal is processed by a CPU 6 and is converted into an analog signal as a flow rate signal by a D/A converter 7. This analog signal has a minimum DC value of 4 mA and a maximum DC value of 20 mA. The analog signal is supplied to a two-wire line L. Note that the D/A converter 7 generates a voltage V used in this flowmeter on the basis of power supplied from an external unit through the line.

As described above, commercial power supply noise signals are generated from the electrodes 1a and 1b. These commercial power supply noise signals are amplified by the amplifiers 3a and 3b and are detected by a commercial power supply noise detecting section 8 constituted by, e.g., an adder 8a. The basic concept of the present invention is that if a timing signal is generated on the basis of a commercial power supply noise signal obtained by the commercial power supply noise detecting section 8, since the timing signal is synchronized with the commercial power supply noise signal, a noise reduction effect can be expected. If no commercial power supply noise signal can be obtained, a pseudo-noise signal having the same period as that of the commercial power supply noise signal is generated, and a timing signal is generated on the basis of the pseudo-noise signal.

With this operation, a timing signal synchronized with a commercial power supply noise signal can always be obtained. Every time a commercial power supply noise signal is frequently interrupted, a pseudo-noise signal must be generated. Although it is assumed that a pseudo-noise signal is generated on the basis of a commercial power supply noise to have the same period as that thereof, it is difficult to generate a pseudo-noise signal having perfectly the same period as that of the commercial power supply noise signal. For this reason, if a commercial power supply noise signal is frequently interrupted, a pseudo-noise signal is generated from every interruption of the noise signal, resulting in slight synchronization errors. In such a case, the synchronization is disturbed, and the output may become unstable.

According to the present invention, therefore, when a commercial power supply noise signal cannot be obtained, no commercial power supply noise is used for a predetermined period of time, e.g., a period corresponding to 10 pulses of a commercial power supply noise signal, and a timing signal is generated by using only a pseudo-noise signal.

Figures 2A, 2B, 2C, 2D, 2E, 2F, 2G, 2H, 2I:
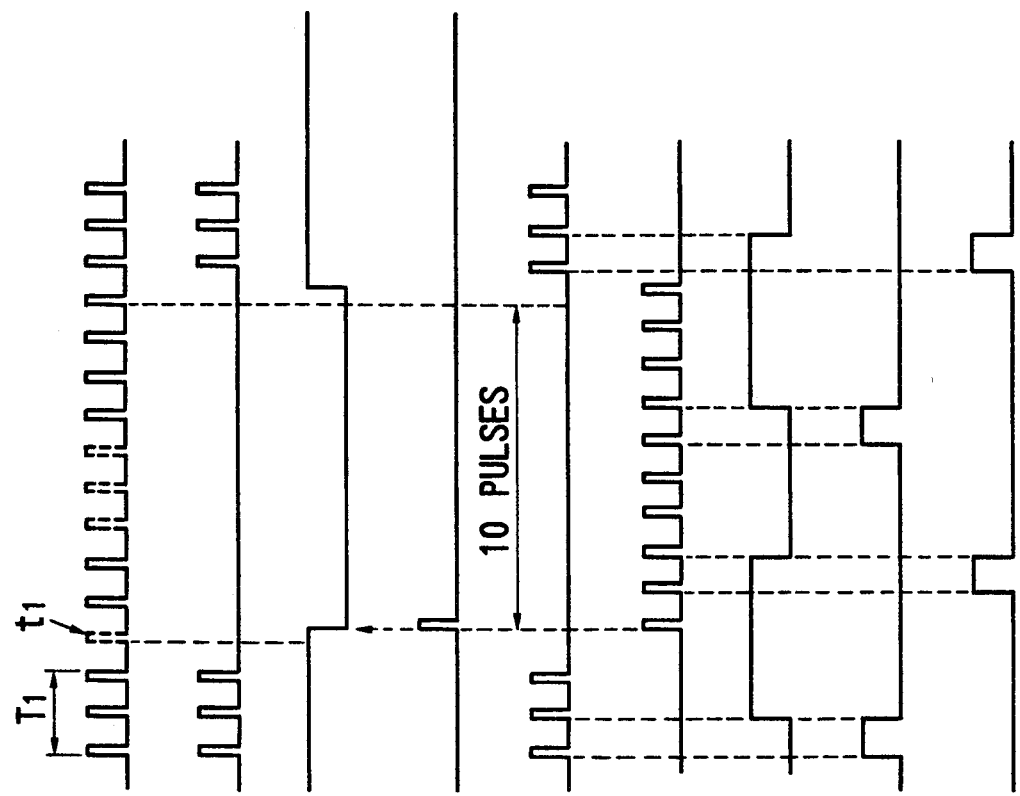
FIGS. 2A to 2I are timing charts showing waveforms at the respective portions of the circuit shown in FIG. 1.

The commercial power supply noise detecting section 8 detects a commercial power supply noise signal and supplies the commercial power supply noise signal shown in FIG. 2A to a control section 20. During a normal operation period, e.g., an interval T1 during which a commercial power supply noise is continuously obtained, the control section 20 supplies the commercial power supply noise signal to a determining section 21, as shown in FIG. 2B (this operation is controlled by a control signal from a weighting section, as will be described later).

The determining section 21 monitors the period of the commercial power supply noise signal supplied from the control section 20. If no commercial power supply noise signal can be obtained, as indicated by, e.g., time t1 in FIG. 2A, the determining section 21 supplies the signal shown in FIG. 2D, which represents a commercial power supply noise signal interruption, to a weighting section 22. The weighting section 22 generates a "1"-level signal, as shown in FIG. 2C, when no commercial power supply noise interruption signal is supplied from the determining section 21, i.e., while a commercial power supply noise signal is continuously detected. When a commercial power supply noise interruption signal is supplied, the weighting section 22 keeps generating a "0"-level signal for a predetermined period of time, i.e., a period corresponding to 10 pulses of a commercial power supply noise signal in this case.

The output signal from the weighting section 22 is supplied to the control section 20. Upon reception of a "1"-level signal from the weighting section 22, the control section 20 outputs the commercial power supply noise signal, supplied from the commercial power supply noise detecting section 8, to the determining section 21. If the control section 20 receives a "0"-level signal from the weighting section 22, the section 20 does not output the commercial power supply noise signal, supplied from the commercial power supply noise detecting section 8, to the determining section 21.

For this reason, the commercial power supply noise signal output from the determining section 21 is not output during a period corresponding to 10 pulses from time t1, as shown in FIG. 2E. While a commercial power supply noise signal is output from the determining section 21, since the signal is supplied to a pseudo-noise signal generating section 13, the section 13 keeps generating a pseudo-noise signal synchronized with the commercial power supply noise signal. Note that while a commercial power supply noise signal is continuously supplied, the pseudo-noise signal generating section 13 does not output any pseudo-noise signal. If, however, a commercial power supply noise signal is not continuously generated, a continuously generated pseudo-noise signal is supplied to a timing signal generating section 9 for a predetermined period of time, i.e., a period corresponding to 10 pulses in this case, as shown in FIG. 2F.

The timing signal generating section 9 receives commercial power supply noise from the determining section 21 while a commercial power supply noise signal is continuously generated. If a commercial power supply noise signal is not continuously generated, the timing signal generating section 9 receives the pseudo-noise signal generated by the pseudo-noise signal generating section 13. Since the two input noise signals have the same period, the timing signal generating section 9 can continuously generate the sampling signals shown in FIGS. 2H and 2I, and the excitation timing signal shown in FIG. 2G.

As described above, even if detection of a commercial power supply noise signal is interrupted, a timing signal can be stably generated. However, there is a slight phase difference between the commercial power supply noise signal supplied to the timing signal generating section 9 and the pseudo-noise signal generated by the pseudo-noise signal generating section 13 at the time of a switching operation. While the noise signal is continuously supplied to the timing signal generating section 9, such a slight phase difference is set in an in-phase state, and hence no significant problem is posed.

In this case, however, even if detection of a commercial power supply noise signal is not continuously disabled but is frequently disabled, a timing signal is generated by using a pseudo-noise signal for a predetermined period of time, i.e., a period corresponding to 10 pulses of a commercial power supply noise signal in this embodiment, after commercial power supply noise cannot be detected. As described above, since there is a slight phase difference between the pseudo-noise signal and the commercial power supply noise signal, if a commercial power supply noise signal cannot be obtained more frequently, the timing signal generated by the timing signal generating section 9 becomes unstable.

Figure 3:
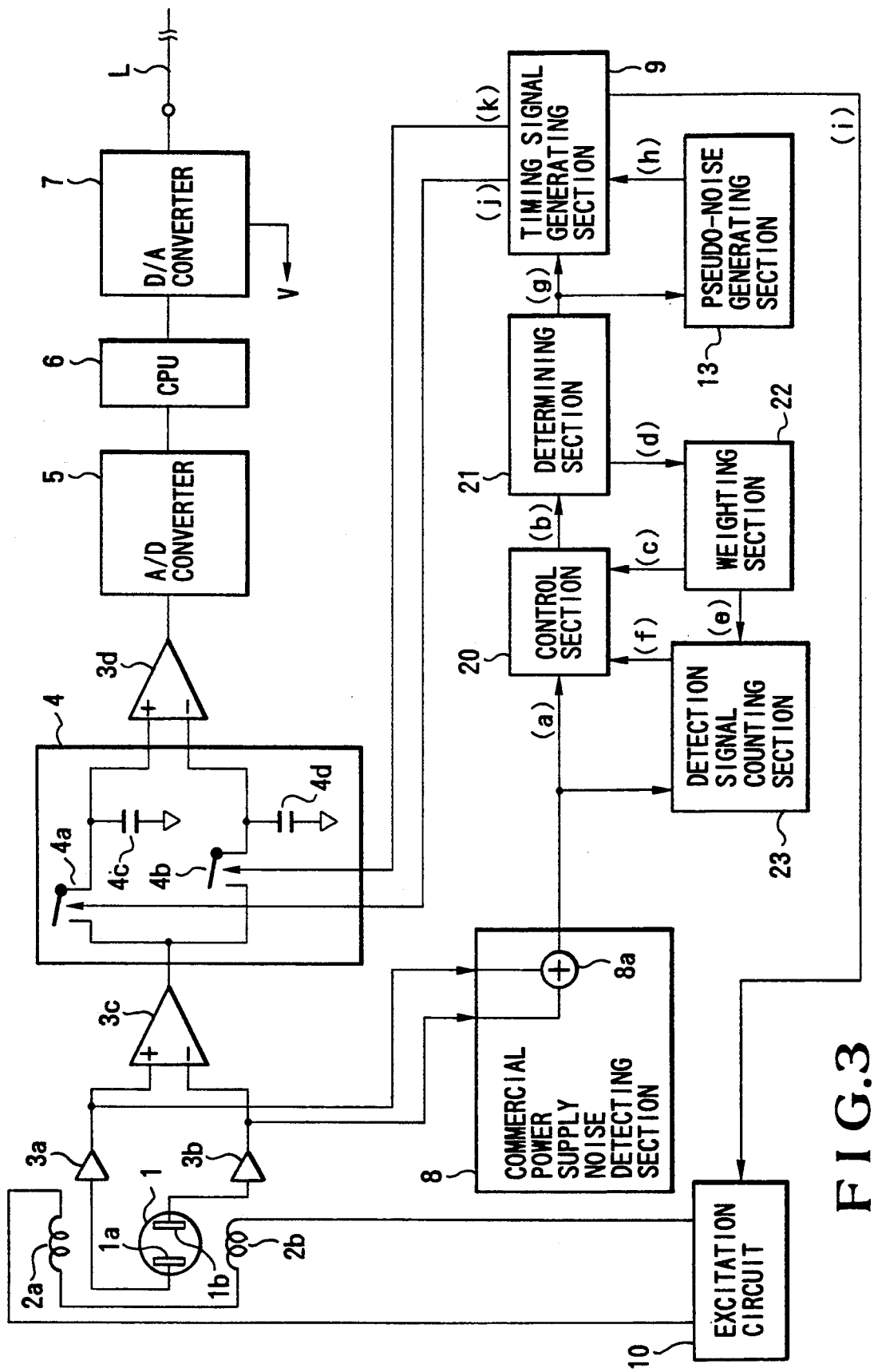
FIG. 3 is a block diagram showing the arrangement of another embodiment of the present invention.

FIG. 3 shows a circuit for generating a stable timing signal even in such a case. The flowmeter in FIG. 3 is the same as that shown in FIG. 1 except that a detection signal counting section 23 is added, and the function of the control section is partially changed.

More specifically, when no commercial power supply noise is obtained at time t1, a determining section 21 supplies the signal shown in FIG. 4D to a weighting section 22. As a result, the weighting section 22 keeps generating a "0"-level signal for a period corresponding to 10 pulses of a noise signal, as shown in FIG. 4C. In accordance with this operation, a pseudo-noise signal generating section 13 generates a pseudo-noise signal, as shown in FIG. 4H, and a timing signal generating section 9 generates the timing signals shown in FIGS. 4I, 4J, and 4K, respectively.

If a commercial power supply noise signal cannot be obtained frequently, the pseudo-noise signal generated by the pseudo-noise signal generating section 13 is continuously output to prevent frequent unstable states at the time of each switching operation. For this purpose, a weighting section 22 supplies a pulse signal to a detection signal counting section 23 when a period corresponding to 10 pulses of a noise signal is ended, as shown in FIG. 4E.

With this operation, the detection signal counting section 23 counts the pulses of a commercial power supply noise signal to check whether the commercial power supply noise signal is continuously generated for a predetermined period of time, i.e., a period corresponding to three pulses of the commercial power supply noise signal in this case. In the case shown in FIGS. 4A to 4K, although the commercial power supply noise signal is continuously obtained for a period corresponding to two pulses from time t2 but cannot be obtained at a time corresponding to the third pulse. The detection signal counting section 23 keeps outputting a "0"-level signal until the commercial power supply noise signal is obtained for a period corresponding to three pulses or more, as shown in FIG. 4F.

Assume that a control section 20 receives the "0"-level signal shown in FIG. 4C from the weighting section 22 or the "0"-level signal shown in FIG. 4F. In this case, even if a commercial power supply noise signal is supplied from a commercial power supply noise detecting section 8, the control section 20 outputs no signal to the determining section 21. For this reason, even if the commercial power supply noise signal is supplied for a period corresponding to two pulses from time t2, no signal is output, as shown in FIG. 4G.

Since the commercial power supply noise signal is continuously generated from time t4, the detection signal counting section 23 sets the output signal at level "1" at time t5 at which the noise signal is continuously generated for a period corresponding to three pulses, as shown in FIG. 4F. As a result, the control section 20 outputs the input commercial power supply noise signal to the determining section 21 again, as shown in FIG. 4G.

As described above, if a commercial power supply noise signal is not continuously generated for a predetermined period of time, i.e., a period corresponding to three pulses or more in this case, a pseudo-noise signal is continuously generated by the pseudo-noise signal generating section 13, as shown in FIG. 4H, thereby generating a timing signal. Since a timing signal is continuously generated by using a pseudo-noise signal until a commercial power supply noise signal can be stably obtained, a signal switching operation is not frequently performed, thus preventing an unstable state.

In addition to the above-described embodiments, if each function is realized by a microcomputer, hardware can be easily formed.

As has been described above, according to the present invention, when no commercial power supply noise signal can be obtained, a timing signal is generated for a predetermined period of time by using a pseudo-noise signal. Therefore, a timing signal can be stably generated.

What is claimed is:

1. An electromagnetic flowmeter for obtaining a detection signal by sampling voltages generated from electrodes in contact with a conductive fluid flowing in a magnetic field at a predetermined timing, comprising:

external noise detecting means for detecting external noise having a predetermined period, superposed on the fluid, from said electrodes;

pseudo-noise generating means for supplying a pseudo-noise signal, the pseudo-noise signal generated as a function of the external noise so as to be synchronized with and to have the same period as the external noise, the pseudo-noise signal being supplied for a predetermined period of time if said external noise detecting means determines that no external noise signal is detected; and timing signal generating means for generating a timing at which an excitation current for generating the magnetic field is generated, and the sampling timing on the basis of the pseudo-noise signal while the pseudo-noise signal is kept supplied, and causing said external noise detecting means to generate the timing at which the excitation current for generating the magnetic field is generated, and the sampling timing while no pseudo-noise signal is supplied.

* * * * *